Patented Jan. 5, 1937

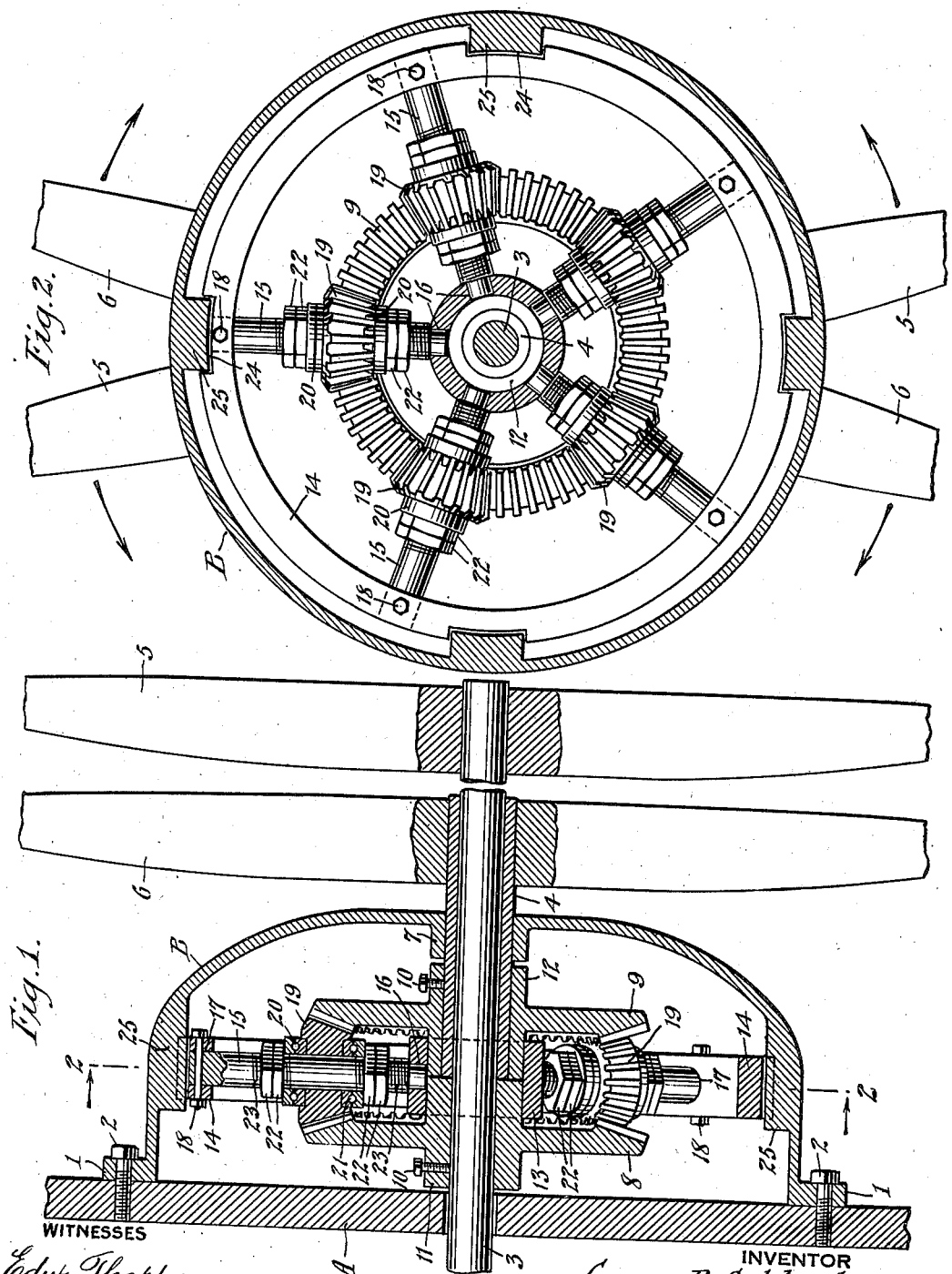

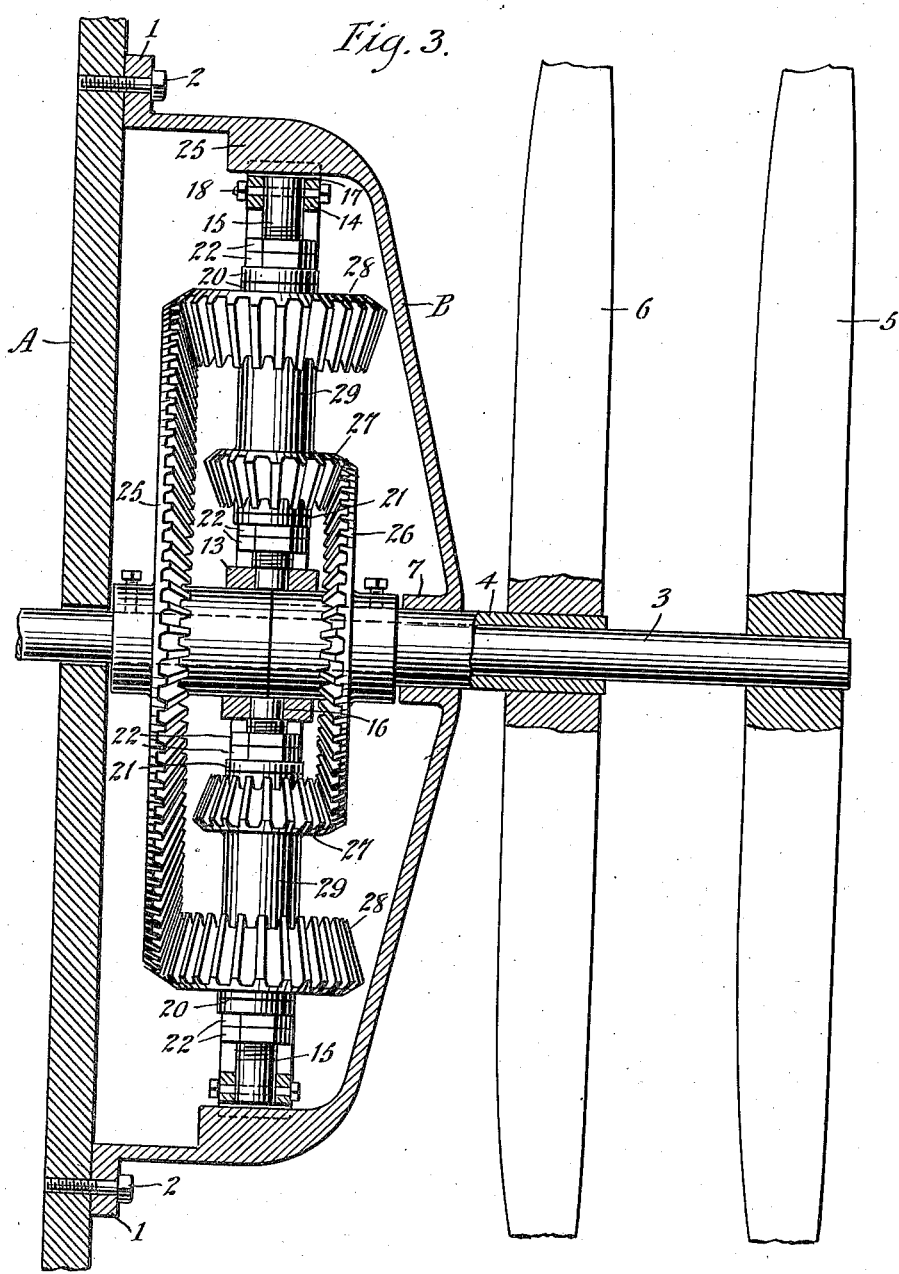

2,067,023

UNITED STATES PATENT OFFICE 2,067,023

MULTIPLE PROPELLER DRIVING MEANS

George R. Schleicher, New York, N. Y.

Application March 20, 1936, Serial No. 69,914

4 Claims. (Cl. 74—389)

This invention relates to multiple propeller driving means, an object of the invention being to provide improved means for transmitting motion to a pair of propellers driving them in opposite directions at the same speed or at different speeds, and while the invention is particularly adapted for aircraft it is also adapted for marine use and for many other purposes and I do not wish to be limited to the particular use to which the device is put.

A further object is to provide improved mounting for the driving means which permits of a certain amount of longitudinal movement to compensate for strain and to take up wear.

With these and other objects in view, the invention consists in certain novel features of construction and combinations and arrangements of parts, all of which will be more fully described hereinafter and pointed out in the claims.

In the accompanying drawings—

Figure 1 is a view in longitudinal section illustrating one embodiment of my invention:

Fig. 2 is a sectional elevation on the line 2—2 of Fig. 1;

Fig. 3 is a view in longitudinal sectional elevation illustrating a modification.

Referring more particularly to Figs. 1 and 2 of the drawings, the reference character A is employed to indicate a support which is shown as a wall but may constitute a portion of an airplane fuselage, a boat, or any other vehicle. To this support A a casing B is secured, and I have illustrated the casing B as having flanges 1 at its edges secured by screws 2 to the support A. 3 represents a drive shaft which may constitute the crank shaft of an internal combustion engine but may, of course, be driven in any other manner. On this shaft 3 a tubular shaft 4 is supported and on the other ends of the shafts 3 and 4, propellers 5 and 6 are mounted and spaced apart as far as may be desired in front of the casing B. The casing B has a bearing 7 receiving the tubular shaft 4, which bearing may be of any desired length and construction to properly perform its function.

On shafts 3 and 4, within the casing B, bevel facing gears 8 and 9 respectively, are secured. In other words, the bevel gear 8 is fixed to its shaft and I have illustrated as a securing means a screw 10 projected through the hub 11 of the gear 8 and binding or locking against the shaft 3. The gear 9 is shown as having a hub 12 with a similar screw 10 extending through the hub and engaging the tubular shaft 4. These hubs 11 and 12 at the inner portions of the gears are of the same external diameter and support thereon a ring 13. A second ring 14 of appreciable greater diameter than the gears 8 and 9 is disposed concentrically with the ring 13, and these two rings 13 and 14 support a circular series of shafts 15. The inner ends of the shafts are illustrated as reduced in diameter and located in openings 16 in the inner ring 13, and the outer ends of these shafts are located in openings 17 in the outer ring 14 and secured therein and held against turning movement by bolt pins 18 extending through the ring 14 and the outer ends of the shafts 15. While the invention is not limited to the particular number of shafts 15, I believe that five is a preferable number and this number is illustrated in Figs. 1 and 2 of the drawings. On these shafts 15 bevel pinions 19 are mounted to turn freely and mesh with both of the gears 8 and 9. These pinions 19 are mounted between ball bearings 20 and 21 and these ball bearings are held in operative relation to opposite sides of the pulleys by nuts 22 screwed on to the threaded portions 23 of the shafts 15 and against the ball bearings 20.

The outer ring 14 is provided with a series of recesses 24 which receive webs 25 on the inner portion of the casing B so that while these webs in the recesses 24 serve as keys to hold the driving mechanism against rotary movement they permit of a certain amount of longitudinal movement of the driving mechanism to compensate for wear and to allow for strains and stresses.

In the modification illustrated in Fig. 3 of the drawings, the construction and arrangement of the several parts of the driving mechanism are alike in most respects and similar reference characters are employed to indicate like parts in Fig. 3 as well as in the other figures of the drawings. This modification is illustrative of the fact that my invention covers not only the idea of transmitting power to drive two propellers in opposite directions at the same speed, but also enables the propellers to be driven in opposite directions at different speeds. To accomplish this the facing gears 25 and 26 corresponding to the gears 8 and 9 of Figs. 1 and 2, are of different diameters and the shafts 15 which carry a pair of bevel pinions 27 and 28, may be fixedly connected by a hub 29. The pinion 27 is preferably smaller in diameter than the gear 28 and meshes with gear 26 while the pinion 28 meshes with gear 25, and as these several pairs of gears are of different ratios, the speed transmitted to the shafts 3 and 4 and the propellers 5 and 6 thereon will be different. In other words, one of the shafts and its propeller will be driven at an appreciably faster speed than the other and this variableness in speed is determined by the ratio of the gears.

While I have illustrated and described what I believe to be the preferred embodiments of my invention, it is obvious that various slight changes may be made with regard to the form and arrangement of parts without departing from my invention, and hence I do not limit myself to the precise details set forth but consider myself at liberty to make such changes and alterations as fairly fall within the spirit and scope of the claims.

I claim:

1. A multiple propeller driving means including an inner drive shaft, an outer tubular shaft thereon, propellers fixed to the several shafts, a pair of bevel facing gears on the shafts, bevel pinions operatively connecting the facing gears and transmitting motion from one to the other, radial shafts supporting the bevel pinions, inner and outer rings supporting the shafts, and a casing providing a mounting for the outer ring and permitting longitudinal movement of the outer ring relative thereto.

2. A driving mechanism of the character described, comprising an inner shaft, an outer tubular shaft thereon, a pair of bevel facing gears on the respective shafts, hubs on said gears, an inner ring fitting around said hubs, an outer ring, radial shafts supported in said rings, bevel pinions on said shafts meshing with the facing gears, a casing enclosing the gears, and means operatively connecting the outer ring and casing and permitting a longitudinal movement of the outer ring relative thereto.

3. A driving mechanism of the character described, comprising an inner shaft, an outer tubular shaft thereon, a pair of bevel facing gears on the respective shafts, hubs on said gears, an inner ring fitting around said hubs, an outer ring, radial shafts supported in said rings, bevel pinions on said shafts meshing with the facing gears, and a casing enclosing the gears and providing a mounting for the outer ring, said mounting comprising radially projecting webs in the casing and recesses in the outer ring receiving said webs whereby the outer ring is permitted a longitudinal movement in the casing.

4. A driving mechanism of the character described, including a support, a drive shaft, a second shaft, propellers on the respective shafts, transmission gearing operatively connecting the shafts, a ring around said transmission gearing having recesses therein, and longitudinally extending webs on the support in said recesses so that the ring and the transmission and shafts as a whole are permitted a longitudinal movement in the support.

GEORGE R. SCHLEICHER.